United States Patent
Moore et al.

(10) Patent No.: US 7,048,776 B2
(45) Date of Patent: May 23, 2006

(54) ADVANCED AIR CLEANING SYSTEM AND METHOD

(75) Inventors: Wayne K. Moore, Gaithersburg, MD (US); Daniel B. Nickell, Vienna, VA (US)

(73) Assignee: Radian, Inc., Alexandria, VA (US)

( * ) Notice: Subject to any disclaimer, the term of this patent is extended or adjusted under 35 U.S.C. 154(b) by 379 days.

(21) Appl. No.: 10/288,378

(22) Filed: Nov. 6, 2002

(65) Prior Publication Data

US 2004/0173092 A1 Sep. 9, 2004

Related U.S. Application Data

(60) Provisional application No. 60/331,015, filed on Nov. 6, 2001.

(51) Int. Cl.
*B01D 50/00* (2006.01)

(52) U.S. Cl. ............... 95/8; 95/228; 96/224; 96/365; 96/413; 55/315.1; 73/23.2; 73/31.07

(58) Field of Classification Search ............. 261/118; 95/8, 149, 228; 96/224, 244, 365, 413; 55/315, 55/315.1, 318, 315.2; 73/31.07, 23.2
See application file for complete search history.

(56) References Cited

U.S. PATENT DOCUMENTS

| | | | | | |
|---|---|---|---|---|---|
| 5,601,786 | A | * | 2/1997 | Monagan | 422/108 |
| 5,656,242 | A | * | 8/1997 | Morrow et al. | 96/224 |
| 6,296,693 | B1 | * | 10/2001 | McCarthy | 96/117.5 |
| 2003/0150226 | A1 | * | 8/2003 | Jensen | 62/171 |

\* cited by examiner

*Primary Examiner*—Robert A. Hopkins
(74) *Attorney, Agent, or Firm*—Duane Morris LLP

(57) ABSTRACT

A method and system removes nuclear, biological and chemical (NBC) agents from an air stream from a facility HVAC. The system includes an irradiation zone, a saturation zone and a precipitation zone. A contaminant detection apparatus controls the irradiation, saturation and precipitation of the air stream. The irradiation destroys biological agents along with saturation of air stream with a water based solution. The biological debris and dissolved chemical agents are precipitated out of the air stream by condenser coils. Nuclear agents are removed from the air stream by a diverting the air stream though a bypass filter containing high mass particulate filters and activated charcoal. The contaminants are stored for later removal and destruction. The contaminate detection apparatus includes NBC sensors.

39 Claims, 5 Drawing Sheets

ADVANCED AIR CLEANING SYSTEM AND METHOD

This application claims the benefit of Provisional Application No. 60/331,015, filed Nov. 6, 2001.

BACKGROUND

In the past, terrorist attacks on buildings have primarily involved the use of conventional weapons such as explosives, incendiary devices and firearms. Thus building defense systems presently in use are designed to protect against such conventional weapons and involve measures such as physical barriers, fire alarms, metal detectors, security checks and armed security personnel. The discovery of nuclear agents and the development of nuclear weapons, airborne chemical and biological contaminates and toxins has provided terrorist groups with sophisticated assault weapons against which render present building defense measures inadequate. Chemical and biological agents may be introduced within a space by various means, purposeful and unintentional. The majority of such spaces are supplied with ventilation and supply and return ducting. The release of vaporized and micro-grained agents contaminate the space and the ventilation system quickly thereafter. If not deterred in some fashion, the contaminant travels with the air to the central air handling equipment where it may be dispersed throughout the system, thereby contaminating the entire area serviced by the central unit.

An assault with a single or a combination of multiple hazardous airborne contaminants may occur with no perception of danger by the potential victim within a building. Such an assault may be particularly devastating when implemented by an aggressor from within the confines of a target building who is willing to sacrifice his or her life in the attack.

Furthermore, HVAC environmental systems are specifically designed to provide conditioned air throughout a facility generally from a central source. This distribution of air throughout a facility may spread a previously isolated contaminant through the building in a matter of minutes which only serves to exacerbate the situation. Thus today's modern sealed structures with central air conditioning and heating and through duct systems need protection from the spread of these contaminants among its occupants. Additionally, protection is needed from colonies of microorganisms which may live and thrive in the duct systems.

Much effort has gone into trying to destroy atmospheric pathogens with only limited success. It has long been recognized that pathogens may be destroyed in the air if they are irradiated with ultraviolet (UV) light at a germicidal wavelength. In order for the UV light to kill microorganisms, the UV rays must directly strike the microorganisms for a sufficient period of time.

The exposure to UV light necessary to kill microorganisms is a product of time and intensity. However due to the dangers to humans of irradiation from widespread use of UV lamps, exposure to UV light has been limited by government regulation. To overcome these problems there have been various attempts to circulate air passed UV sources in enclosures which act to shield the UV irradiation from the room's occupants. Usually, such systems are free standing or wall or ceiling mounted devices which circulate the air in a single room through the enclosure and, accordingly, whose protection is confined to that room.

While such a system may be highly effective to clean the contents of a single room, normal air conditioning and heating ducts would continue to allow circulation of untreated air into and out of a room. This allows untreated air containing pathogens from another room or in the duct system to enter the room and come in contact with the occupants before being sufficiently treated. Consequently, this allows a certain amount of pathogens in a room to enter the duct system prior to being treated by the free standing unit.

Various attempts have been made to place ultraviolet light sources in duct systems to germicidally cleanse fluids such as air as the fluid passes through the duct system. However, the intensity of the irradiation required to treat the air results in significant energy consumption.

These prior art UV systems are not effective against other airborne contaminants such as chemical agents or nuclear agents. Furthermore, even the airborne contaminants that are killed remain in circulation which may lead to false threat detections. One of the most difficult aspects of controlling the effects of airborne contaminants, especially biological materials, is the length of time required to assess and characterize the type and quantity of materials involved. With existing detectors and analyzers, this period is generally measured in minutes, if not hours or days. This period is far too long to wait for a formal assessment before applying appropriate protective measures.

One method to overcome this problem is to assume the facility is under constant attack and to process air using advanced technology continuously. However, this approach unduly wastes valuable resources.

To solve the problems associated with these threats and the deficiencies associated with prior art approaches, it is the object of the present disclosure to present a novel air cleaning method and apparatus that maintains a rapid response to varied threats especially designed for use in high profile buildings subject to hostile attack involving a broad range of nuclear, biological, or chemical air contaminants.

It is another object of the present disclosure to provide an air cleaning system with an air stream contained within a bounded passage. The system comprising: an air stream contamination detection apparatus, an air stream irradiation apparatus, an air stream hydroscopic saturation apparatus and an air stream precipitation apparatus in operational contact with said air stream.

It is still another object of the present disclosure to provide an air cleaning system with a continuous air stream. The system comprising: means for containing the air stream; means for monitoring the air stream for contaminates; means for irradiating the air stream; means for saturating the air stream with a liquid solution; and means for precipitating the liquid solution out of the air stream. The means for monitoring, the means for irradiating, the means for saturating and the means for precipitating are in operational contact with the air stream.

It is yet another object of the present disclosure to provide a method of removing contaminates from a continuous air stream thereby providing a processed air stream. The method including monitoring the air stream for contaminates, irradiating the air stream in an irradiation zone, saturating the air stream with a solution in a saturation zone; and, precipitating the solution contaminates out of the air stream in a participation zone. The air stream of the method flows from the irradiation zone, thru the saturation zone to the precipitation zone.

These and many other objects and advantages of the present invention will be readily apparent to one skilled in the art to which the invention pertains from a perusal of the claims, the appended drawings, and the following detailed description of the preferred embodiments.

DETAILED DESCRIPTION

An embodiment of the Air Cleaning System (ACS) is designed to be in constant operation while providing a high level of air cleaning at all times, with other functions such as atomic particle filters that are not applied until contaminants are detected. Fortunately, the detection of nuclear and chemical contaminants is almost instantaneous, so leaving these filters off line until contamination is detected is not likely to pose a threat to building occupants. Constant use of these special filters, on the other hand as discussed above, would create/untenable maintenance requirements and expenses.

The ACS is capable of protecting a facility against both contamination of the air supply from outside and from contaminants hand carried into the building in concealed packages, envelopes or briefcases.

Figure 1:
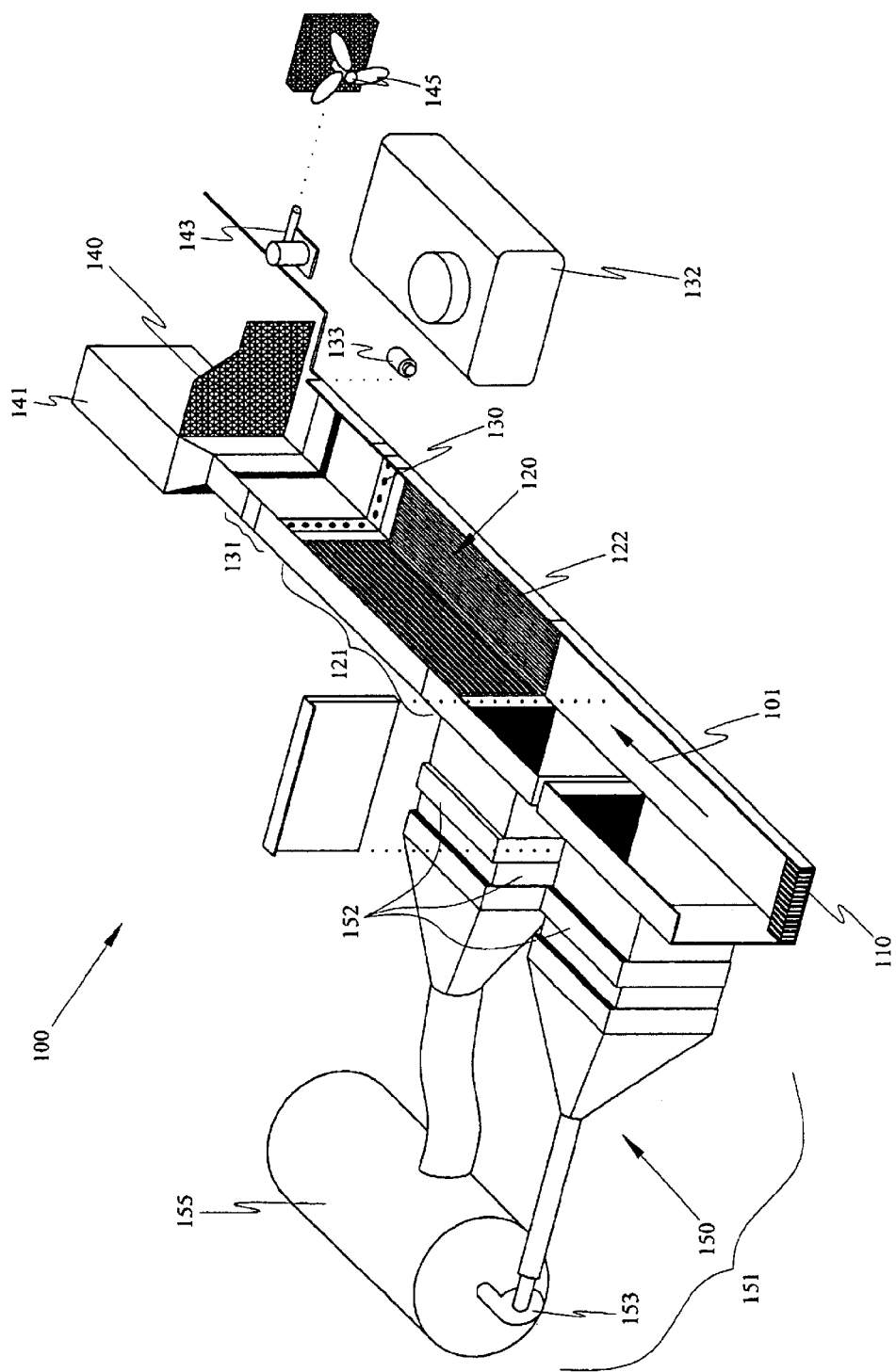
FIG. 1 is an embodiment of an air cleaning system according to the disclosure.

An embodiment of the ACS system 100 shown in FIG. 1, comprises four major elements in defined zones with various components integrated within each element.

A contaminant detection element 110 monitors and detects contaminants carried within the air stream 101 and signals full power operation of the irradiation element 120 in the irradiation zone 121, initiation of operation of the hydroscopic element 130 in the saturation zone and the initiation of the precipitating element 140 in the precipitation or condensate zone 141. The contaminant detector element contains a processor that also signals operation of additional elements present in other embodiments discussed later.

The irradiation element 120 subjects the airflow within the confined and controlled space within the irradiation zone 121 to levels of electromagnetic wavelength sufficient to be lethal to known biological agents within the time of exposure. The irradiation is provided by electromagnetic wave generators 122, which can include UV or infrared (IR) lamps or in an alternative embodiment by electron beam generators (not shown). Depending upon the airflow, the irradiation section can vary in length from 60 inches to 84 inches long. The irradiation element includes sensors that monitor the levels of irradiation continuously.

The hydroscopic element 130 saturates the air stream 101 in the saturation zone 131 with a nearly atomized water curtain that adsorbs particulate, dead biological material and various hydroscopic vapors. The hydroscopic element 130 includes a water tank 132 with water or a water based solution. The hydroscopic element 130 injects water into the air stream using atomizer nozzles. The number of nozzles is dependant upon the airflow and cross section of the duct section in which the nozzles are installed. The water supply may also incorporate a germicidal injection or chlorination to ensure adequate decontamination and adequate decontamination of residual captured waste safety. When activated, a high pressure fluid pump 133 provides water to the manifolds supplying the injectors. Nozzles atomize the water in a flat fan shaped pattern. The injectors are positioned to enable full airflow saturation. A control logic built into the hydroscopic element enables spray cessation if the airflow is stopped through feedback from the air handling unit and a velocitometer. Cessation is achieved using an electrically energized valve.

The precipitation element 140 is a refrigeration loop that forces condensation of the saturated airflow within the precipitation zone 141 upon a condenser plate or coils. Upon energization, the compressor/pump 143 initiates refrigerant circulation through the evaporator 145 and condensing coils/plates. The evaporator coil is mounted externally and dumps heat into the space outside of the HVAC ducting or exterior of the building, depending upon the design. The condensing coil/plate is coated with a low friction material, preferably a fluoropolymer, which facilitates the enablement of fluid to run downward to a catch basin at the base of the coil where it is siphoned away for disposal.

The contaminant detection element 110, in an embodiment, also includes detectors that enable the near instantaneous identification of chemical agents and vapors and provides identification of the biological agents after sampling. Analysis of biological agents may require from twenty minutes to two hours time, depending upon the technology used. In some embodiments a bypass filter 150 in a bypass zone 151 provides a deep bed by which chemical and biologic agents may be captured within deep bed activated charcoal filters 155 for later disposal. When in operation, the bypass filter 150 shunts the airflow through a separate system prior to the irradiation zone 121 with air flow diverters 152 controlled by the contamination detection element 110.

Embodiments of the system are operable in two or three stages. The first stage, normal operation, provides irradiation of the air stream 101 at all times. The irradiation level (radiation intensity) is less than that during a detected incident to extend lamp life and reduce energy consumption. Normal operation (stage one) routes all return air through an irradiation chamber that exposes the molecular content to full spectrum radiation, including ultraviolet, visible, near infrared and far infrared electromagnetic waves. The intensity of radiation is that which is found in medical institutions to kill common airborne bacterial and viral contaminants. The intensity is directly correlated to exposure of the volume over time.

The second stage, enhanced operation, provides high intensity irradiation of the air stream with operation of saturation and precipitation zones 131 and 141, respectively, to capture particulate and soluble chemical vapors from the air stream. Enhanced operation (stage two) initiates operation of the saturation and precipitation zones 131 and 141, respectively, and increases the radiation intensity level of the irradiation zone 121 to a level that is identified as deadly to known biological agents. The levels of radiation are such that 99.9% of the following are rendered impotent: Bacterial Agrobacterium Turnafaciens; *Bacillus Anthraccis; Bacillus Megateriurn* (vegetative and spores); *Bacillus Subtilis* (vegetative and spores); *Clostridium Corynebacterium; Escherichia Coli; Legionella Bozemanii; Legionella Dumofffi; Legionella Gormanii; Legionella Micdadei; Legionella Pneumophilia; Leptospera Interrogans* (infectious jaundice); *Mycobacterium; Tuberculosis Proteus Vulgaris; Pseudomonas Aeruginosa* (laboratory and environmental strains); *Rhodosperillium Rubrum; Salmonella Enteritidis* (enteric fever); *Salmonella Paratyphi; Salmonella Typhimurium; Salmonella Typhosa* (typhoid fever); *Shigella Dysenteriae* (dysentery); *Shigella Flexneri* (dysentery); *Staphylococcus Epidermidas; Staphylococcus Aureus; Streptococcus Faecalis;* and, the following viruses: Bacteriophage (*E.coli*); Hepatitis virus; Influenza virus; Poliovirus; Rotavirus.

The third stage, agent threat operation, diverts the air stream to particulate and catalytic filters especially designed for the capture of nuclear and chemical contaminants. Embodiments with the third stage capability integrate a bypass filter 150 upon an alarm condition which causes the airflow to be rerouted to an auxiliary air handler 153 (high speed blower) that pressurizes the air and forces it through deep bed activated charcoal filters. The filters remove the contaminant from the airflow. The cleansed air is then routed back to the normal path. This bypass filter system is operable in conjunction with the stage two levels of irradiation and the saturation/precipitation zone. Sensors 320 shown in FIG. 3 are incorporated to measure the differential pressure across the filter(s) 151 and 155 to determine the remaining useful life of the filter before requiring change and disposal.

Figure 2:
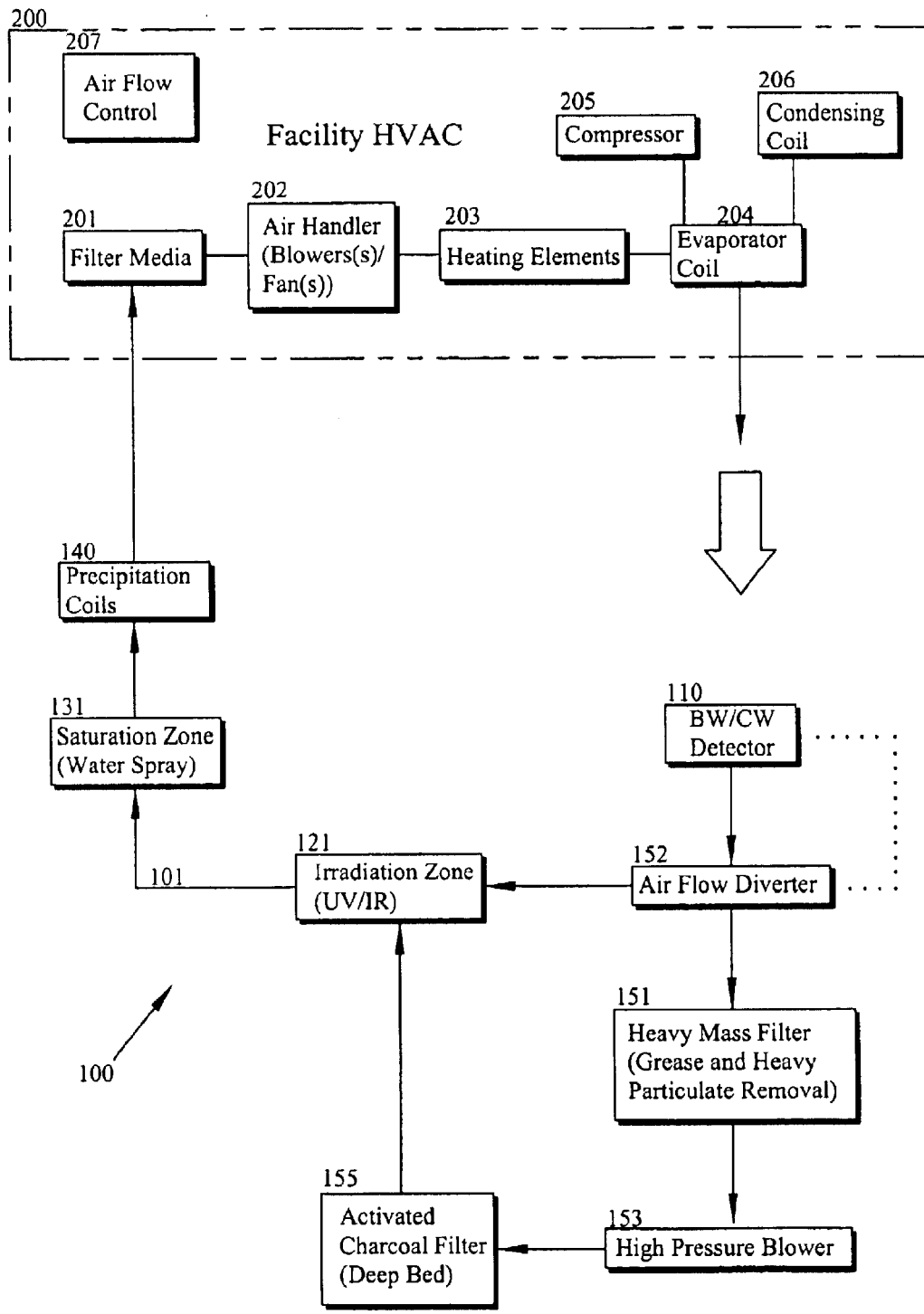
FIG. 2 is a functional diagram of an embodiment with a bypass filter.

The functional diagram of the embodiment in FIG. 1 is shown in FIG. 2 with like components having the same reference numerals. FIGS. 2–4 contain functional representations of embodiments of the ACS in operational connection with a facility HVAC. The facility HVAC 200 includes filters 201, air handlers 202, heating elements 203, an evaporator coil 204 in direct contact with the air stream. The evaporator coil of the HVAC also includes a compressor 205 and a condensing coil 206 in contact with ambient air. These elements are common to HVAC systems. The air stream is taken by the HVAC system from outside air or indoor air and is filtered and conditioned (heated or cooled) by the components of the HVAC system. The ACS is interposed within a plenum of the HVAC.

Normal operation of the system 100 permits minimal power consumption. When in normal operation, the irradiation group is operated at less than full power and the contaminant detection element 110 is in full operation with the other elements essentially dormant. Upon sensing contaminants by a change in the reflection or refraction of the air stream as determined by a light source and sensors, the contaminant detection element 110 initiates closures of multiple relays. Upon relay initiation, full power is provided to the irradiation element 120, the hydroscopic element 130, and the precipitating element 140. The activation of these elements also initiates an alarm signal. Upon activation of the normally dormant elements, the system is in an Active Mitigation Mode (AMM). The AMM mode of operation continues until the system is manually reset for an amount of time in which the contaminant may be identified and a pronounced not harmful. The AMM may also be controlled through predefined parameters and computer interface or preset timer operation. The AMM may also include the activation of other systems.

Figure 3:
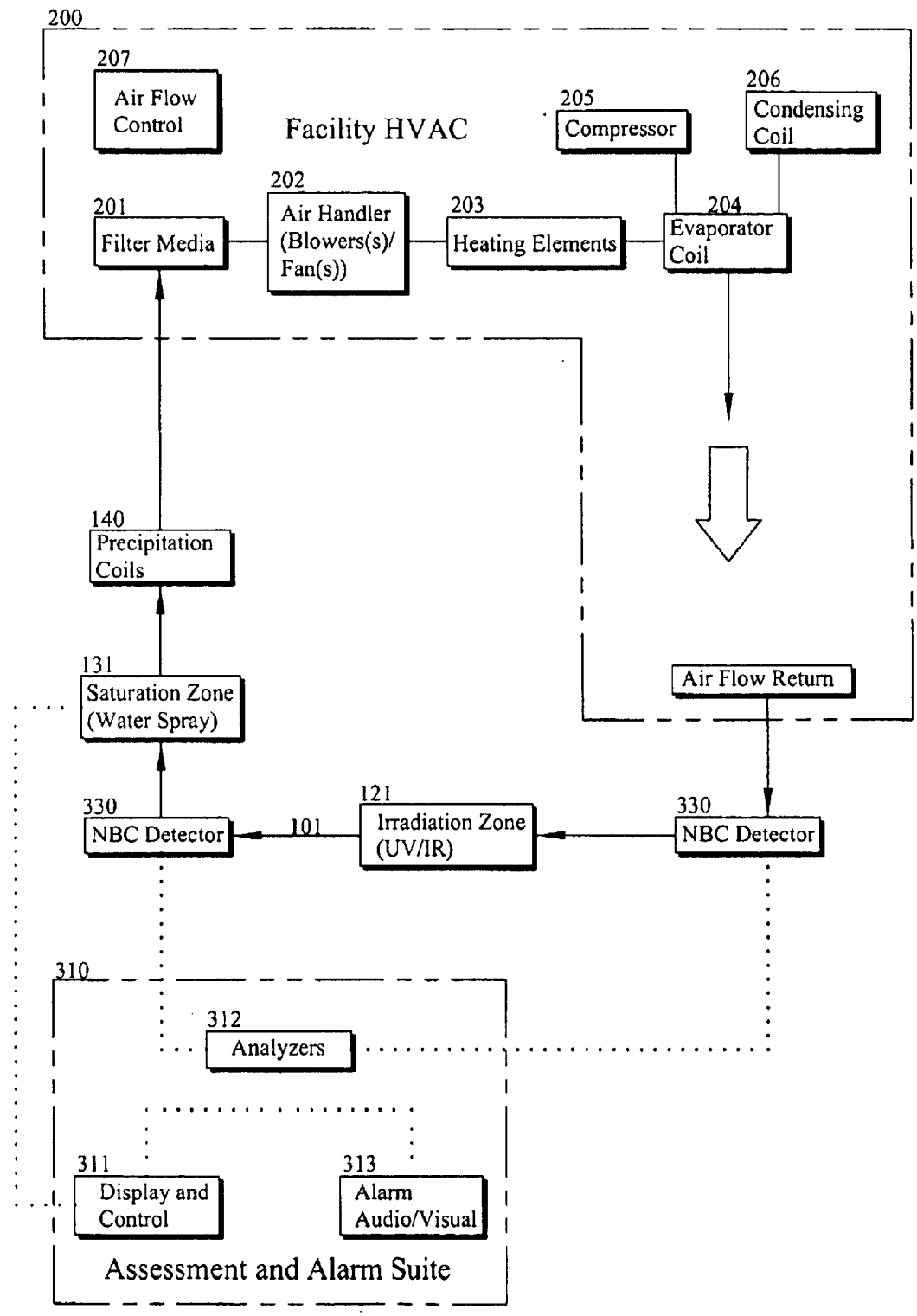
FIG. 3 is a functional diagram of an embodiment with automatic control.
Figure 4:
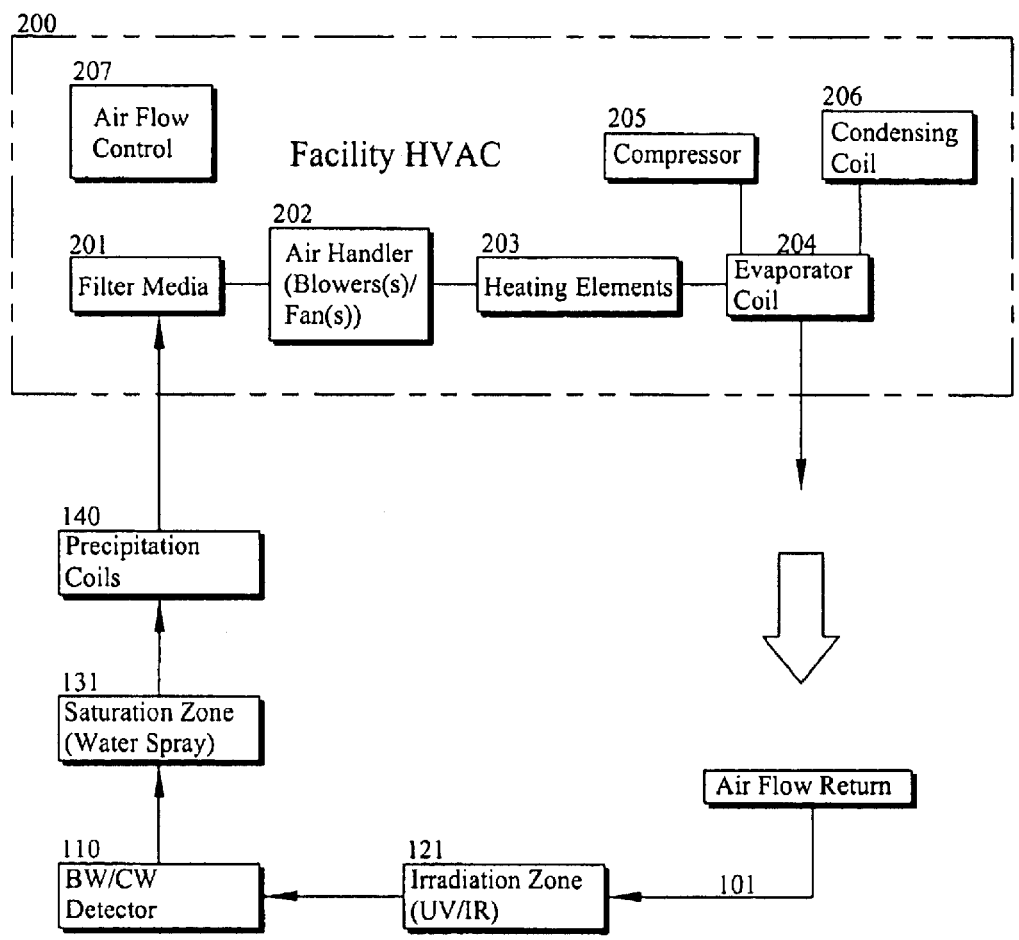
FIG. 4 is a functional diagram of an embodiment for plenum augmentation.

FIG. 3 shows an embodiment where the contamination detection element 110 includes a contaminant assessment and alarm suite 310, enabling additional computer automated control. The assessment and alarm suite contains display and control functions such as a microcomputer, lap top, or circuit board with an LCD or CRT display. The assessment and alarm suite also contains an analyzer capable of determining the type of contaminants. The assessment and alarm suite controls the operation of the ACS and receives constant information from the sensors 330 in the nuclear, biological, and chemical (NBC) detector.

In the contaminant assessment and alarm suite 310, sampling of the air stream is initiated upon an alarm condition from the sensors 330. Separate chemical and biological agent sensors 330 are employed. The identification of known chemical warfare agents may be near instantaneous. Identification of known biological warfare agents may require from twenty minutes to two hours of elapsed time. Sampling cycles may be preprogrammed and automatic or may be manually initiated. Depending upon the programming and sophistication of the sensors employed, the system may revert to normal operation if no known contaminant is identified or it may continue to operate while additional assets are utilized to determine the exact nature of the alarm.

The ACS process begins with the intake of outside air through large particle filters common to building air handling systems. A sample of this air is diverted to a suite of NBC detectors 330. Each of these devices perform its design function and reports the assessment to the assessment and alarm suite (AAS) 310 in a continuous manner. The AAS continually evaluates the quality of air taken in to assess whether there has been any increase in one or more potential contaminants. The AAS discerns between the many natural sources and levels of natural contamination (background nuclear radiation, for example) by establishing a baseline for each of these materials in routine operation. The protective measures of the AAS, irradiation, hydroscopic spray and bypass filters are employed only when the level of a particular contaminant rises significantly above the baseline or allowable levels.

In the event the ACS system detects the presence of an unacceptably high level of one or more contaminants entering the air system from outside air, the control mechanism 311 triggers both visual and acoustic alarms 313 to the security staff (if certain contaminants or overwhelming amounts of any contaminant are detected the entire facility is instantly alerted). The system would normally cause the air flow control 207 of the facility HVAC system to close off the intake of outside air and limit the air supply to that already within the facility. The air flow control 207 also moderates the flow of return and outside air sources by floor, sector, or room.

All air to be used in the building is directed through the ACS. In the event atomic particles in significant quantities have been detected, additional filters and cleaners specifically designed for the purpose are introduced into the system as the bypass filter which is controlled by the contaiminate detection element 110. An incidental benefit of this system is that, at all times, air in the facility will be pure to breath and will not contain common environmental irritants or allergenic substances.

Air flowing from the ACS system enters the existing facility HVAC system 200 for heating, cooling, and humidifying as appropriate for the season. Air returning to the cleaning system from circulation in the building is treated very much like the manner just described for outside air. A sample of the return air is passed through an identical suite of detectors and into the AAS. Detection of contaminants from the return air, but not the outside air intake reveals an attack condition of the second type (hand carried into the building). In this instance, the Air Flow Control 207 will close off the return air supply 211 and depend entirely upon outside air for the building, venting return air directly out of the building and not back into recirculation.

The AAS 310 moderates complicated conflicts in which various types and levels of contamination are detected from both outside and return air sources, thereby selecting a mix of outside and return air most likely to result in minimal overall contamination of the most lethal types. The alarm subsystem 313 of the AAS 310 broadcasts appropriate instructions and information throughout the facility and to the facility air flow control 207.

An embodiment of the disclosure is shown in FIG. 4 as a plenum augmentation to combat unintended distribution of chemical and/or biological agents. The plenum augmentation is located in the major return duct(s) to negate the effect of biological and chemical agent insertion. The air is collected within a primary plenum system (ducts and vents) that collects all the return air, adds makeup air and provides the source of supply to the air handling unit (fans/blowers) 202. By installing, within this plenum section, a combination of high intensity UV radiation sources, water curtains, and condenser/precipitation coils, described in detail with reference to previous embodiments, the agent (chemical or biological) may be rendered impotent. Biological contaminants are killed when exposed to identifiable levels of UV radiation in the irradiation zone 121. Chemical contaminants are captured by the water flow in the saturation zone 131 and precipitated out the air stream by specially designed water curtains and condensing coils 140 of the ACS. In addition, the water curtain and condenser set also remove the irradiated biological debris. Sensors, biological and chemical weapons detectors, augment the installation to ensure adequate levels of contaminant removal. The precipitation element 140 cycles the precipitant (water and contaminants) through micro-filtration elements (not shown) thereby collecting the particulate contaminants and the residue for distillation or catalytic conversion.

Plenum augmentation with the ACS system may also be external to the plenum in the form of emergency sets, semi-mobile, and stand alone modules that may be plumbed into an existing system in single or multiple sets adequate to meet the air flow requirements until more permanent installations may be accomplished.

Figure 5:
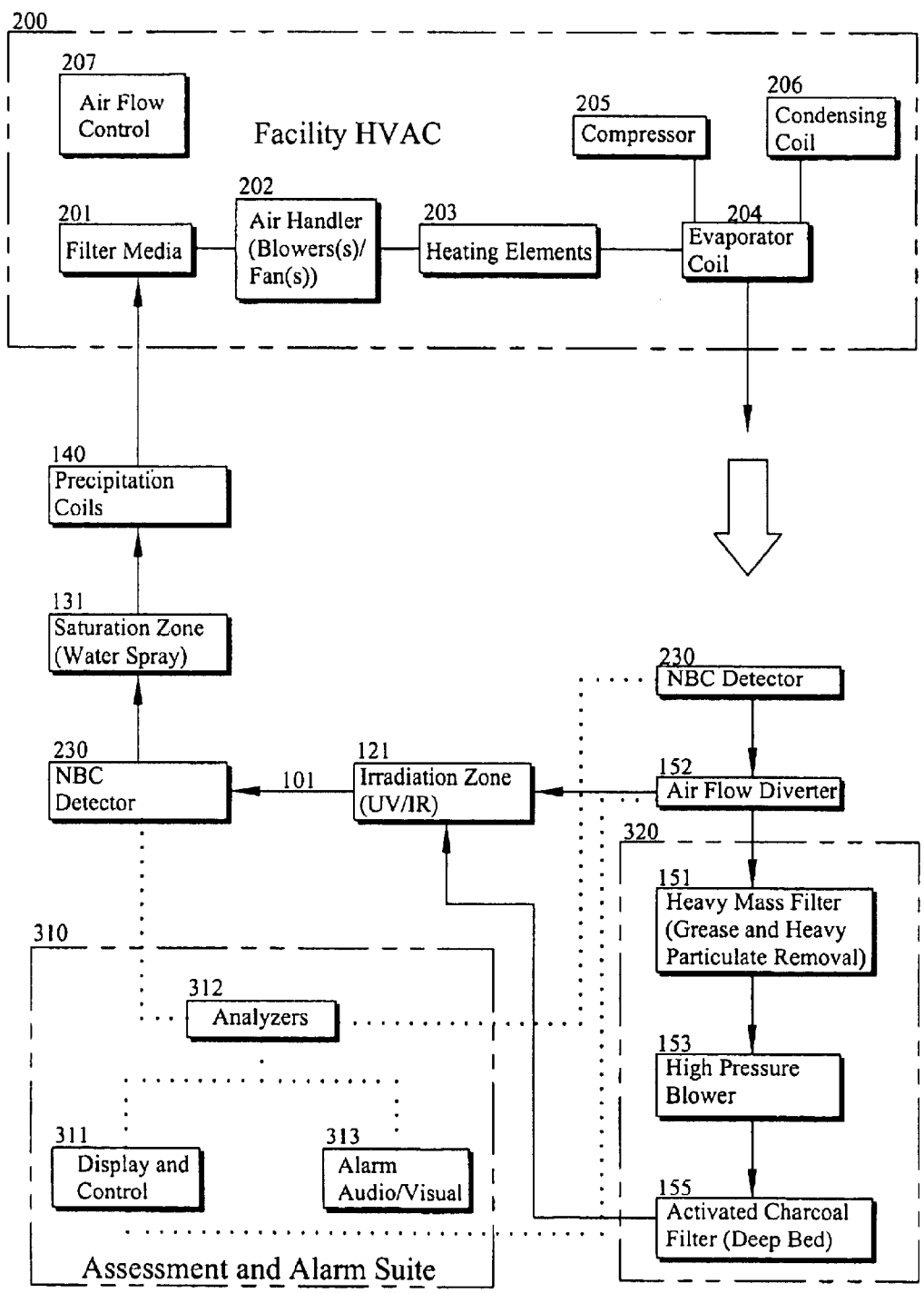
FIG. 5 is a functional diagram of an embodiment with a bypass filter for plenum augmentation.

The schematic in FIG. 5 depicts an embodiment of plenum augmentation ACS system of FIG. 3 with the addition of the bypass filter described in FIG. 2, designed to detect, analyze, and respond to a various degrees of severity of an event.

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What we claim is:

1. An air cleaning system with an air stream contained within a bounded passage comprising: an air stream contamination detection apparatus; an air stream irradiation apparatus; an air stream hydroscopic saturation apparatus; and, an air stream precipitation apparatus in operational contact with said air stream, wherein the air stream contamination detection apparatus comprises a light source and reflection/refraction sensors.

2. An air cleaning system with an air stream contained within a bounded passage comprising: an air stream contamination detection apparatus; an air stream irradiation apparatus; an air stream hydroscopic saturation apparatus; and, an air stream precipitation apparatus in operational contact with said air stream, wherein the air stream precipitation apparatus comprises a condenser surface in operational contact with the air stream and the condenser surface is coated with a fluoropolymer.

3. An air cleaning system with an air stream contained within a bounded passage comprising: an air stream contamination detection apparatus; an air stream irradiation apparatus; an air stream hydroscopic saturation apparatus; an air stream precipitation apparatus in operational contact with said air stream; and, an auxiliary filter, said auxiliary filter comprising a second bounded passage, at least one filter within the second bounded passage and a routing device, the routing device capable of selectively diverting the air stream through the second bounded passage.

4. The air cleaning system of claim 3, wherein the at least one filter comprises a heavy mass filter, a high pressure blower and an activated charcoal filter, wherein the high pressure blower forces the air stream through the activated charcoal filter.

5. An air cleaning system with a continuous air stream comprising:
    means for containing the air stream;
    means for monitoring the air stream for contaminates;
    means for irradiating the air stream;
    means for saturating the air stream with a liquid solution; and
    means for precipitating the liquid solution out of the air stream;
    wherein the means for monitoring, the means for irradiating, the means for saturating and the means for precipitating are in operational contact with the air stream, and wherein the means for monitoring the air stream independently controls the operation of: (a) the means for irradiating, and (b) the means for saturating and the means for precipitating.

6. The air cleaning system of claim 5, wherein the contaminates are biological agents.

7. The air cleaning system of claim 5, wherein the contaminates are chemical agents.

8. The air cleaning system of claim 5, wherein the contaminates are nuclear particles.

9. An air cleaning system with a continuous air stream comprising:
    means for containing the air stream;
    means for monitoring the air stream for contaminates;
    means for irradiating the air stream;
    means for saturating the air stream with a liquid solution; and
    means for precipitating the liquid solution out of the air stream;
    further comprising an auxiliary means for filtering and a diversion means for diverting the air stream into the auxiliary means;
    wherein the means for monitoring, the means for irradiating, the means for saturating and the means for precipitating are in operational contact with the air stream.

10. The air cleaning system of claim 9, wherein the means for monitoring the air stream controls the operation of the means for irradiating, the means for saturating the means for precipitating and the means for diverting the air stream.

11. An air cleaning system with an air stream contained within a bounded passage comprising: an air stream contamination detection apparatus; an air stream irradiation apparatus; an air stream hydroscopic saturation apparatus; an air stream precipitation apparatus in operational contact with said air stream; and, a processor, the processor in operational communication with the air stream contamination detection apparatus, wherein the processor independently controls the operation of both
(a) the air stream irradiation apparatus; and
(b) the air stream hydroscopic saturation apparatus and the air stream precipitation apparatus;
in response to the air stream contamination detection apparatus.

12. The air cleaning system of claim 11, wherein the air stream contamination detection apparatus comprises one or more detectors selected from the group comprising nuclear, chemical and biological detectors.

13. The air cleaning system of claim 11, wherein the air stream irradiation apparatus comprises a portion of the bounded passage and at least one electro magnetic wave generator, the at least one electro magnetic wave generator generates electromagnetic waves with a predetermined wavelength and amplitude.

14. The air cleaning system of claim 13, wherein the tolerance limit of predetermined biological agents within the air stream traveling through the portion of the bounded passage is exceeded by exposure to the electromagnetic wave.

15. An air cleaning system with an air stream contained within a bounded passage comprising: an air stream contamination detection apparatus; an air stream irradiation apparatus; an air stream hydroscopic saturation apparatus; and, an air stream precipitation apparatus in operational contact with said air stream, wherein the air stream irradiation apparatus comprises a portion of the bounded passage and at least one electron beam generator.

16. The air cleaning system of claim 15, wherein the tolerance limit of predetermined biological agents within the air stream traveling through the portion of the bounded passage is exceeded by exposure to the electron beam.

17. An air cleaning system with a continuous air stream comprising:
means for containing the air stream;
means for monitoring the air stream for contaminates;
means for irradiating the air stream;
means for saturating the air stream with a liquid solution; and
means for precipitating the liquid solution out of the air stream;
wherein the means for monitoring, the means for irradiating, the means for saturating and the means for precipitating are in operational contact with the air stream, wherein the step of irradiating comprises the step of bombarding the air stream with an electron beam.

18. The method of claim 24, further comprising the step of selecting electromagnetic waves with a wavelength and amplitude that exceed the tolerance limit of predetermined biological agents over their duration of exposure.

19. The method of claim 17, further comprising the step of selecting an electron beam with a power that exceed the tolerance limit of predetermined biological agents over their duration of exposure.

20. A method of removing contaminates from a continuous air stream thereby providing a processed air stream, comprising the steps of:
monitoring the air stream for contaminates;
irradiating the air stream in an irradiation zone;
saturating the air stream with a solution in a saturation zone; and,
precipitating the solution contaminates out of the air stream in a participation zone; wherein the air stream flows from the irradiation zone, thru the saturation zone to the precipitation zone; and,
independently controlling the steps of:
(a) irradiating, and,
(b) saturating and precipitating;
based on detection of contaminates in the air stream by the step of monitoring.

21. The method of claim 20, wherein the step of monitoring comprises the step of detecting the presence of biological contaminates.

22. The method of claim 20, wherein the step of monitoring further comprises the step of detecting the presence of nuclear contaminates.

23. The method of claim 20, wherein the step of monitoring comprises the step of detecting the presence of chemical contaminates.

24. The method of claim 20, wherein the step of irradiating comprises the step of illuminating the air stream with electromagnetic waves.

25. The method of claim 24, wherein the electromagnetic waves are in the ultraviolet or infrared wavelengths.

26. The method of claim 20, wherein the step of saturating comprises the steps of atomizing a water based solution into the air stream.

27. The method of claim 20, wherein the step of precipitating comprise the step of cooling the air stream to a temperature at which the solution condensates onto a condenser surface.

28. The method of claim 20, wherein the step of controlling further comprising the step of selecting from a plurality of irradiation levels based on detection of contaminates in the air stream.

29. The method of claim 20, further comprising the step of receiving the air stream via an air return of a HVAC system.

30. The method of claim 20, further comprising the step of supplying the processed air stream to a HVAC system.

31. The method of claim 27, further comprising the step of collecting the precipitated solution and contaminates in a collection unit.

32. The method of claim 21, wherein upon detecting biological contaminates in the air stream an alarm is activated.

33. The method of claim 32, wherein upon the activation of the alarm, performing one or more mitigating steps based on the contaminate detected from the group comprising:
elevating the level of irradiation above a normal operation level;
initiating the step of saturating; and, initiating the step of precipitating.

34. The method of claim 20, wherein upon detection of a contaminate, the step of monitoring includes the steps of:
analyzing the type of contaminate;
determining the threat of the contaminate; and,
selecting an alarm based on the type of contaminate.

35. The method of claim 20, wherein the step of monitoring comprises the steps of monitoring the air stream upstream of the irradiation zone and monitoring the air stream of the irradiation zone.

36. A method of removing contaminates from a continuous air stream thereby providing a processed air stream, comprising the steps of:
monitoring the air stream for contaminates;
irradiating the air stream in an irradiation zone;
saturating the air stream with a solution in a saturation zone; and, precipitating the solution contaminates out of the air stream in a participation zone; wherein the air stream flows from the irradiation zone, thru the saturation zone to the precipitation zone selectively bypass filtering the air stream prior to irradiating, wherein the selection is based on the type of contaminates detected.

37. The method of claim 36, wherein the step of filtering the diverted air steam in the bypass filter comprises the steps of:

passing the diverted air stream through a heavy mass filter thereby creating a heavy mass filtered air stream; and, forcing the heavy mass filtered air stream through a charcoal filter via a high pressure blower, thereby creating a charcoal filtered air stream; and directing the charcoal filter air stream into the irradiation zone.

38. The method of claim 36, wherein upon detecting biological contaminates in the air stream an alarm is activated.

39. The method of claim 38, wherein upon the activation of the alarm, performing one or more mitigating steps from the group comprising:

elevating the level of irradiation above a normal operation level;

initiating the step of saturating;

initiating the step of precipitating; and, selecting bypass filtering.

* * * * *